United States Patent [19]
Freeburg et al.

[11] Patent Number: 5,471,471
[45] Date of Patent: * Nov. 28, 1995

[54] SIGNAL COMMUNICATION METHOD AND APPARATUS

[75] Inventors: Thomas A. Freeburg, Arlington Heights; Dennis E. Burke, Elmhurst; Paul Odlyzko, Arlington Heights, all of Ill.

[73] Assignee: Motorola, Inc., Schaumburg, Ill.

[*] Notice: The portion of the term of this patent subsequent to Sep. 28, 2011, has been disclaimed.

[21] Appl. No.: 817,023

[22] Filed: Jan. 3, 1992

[51] Int. Cl.⁶ .................................. H04B 7/00; H04J 3/12
[52] U.S. Cl. ..................... 370/79; 370/85.11; 370/94.1; 370/110.1; 379/63; 455/54.1
[58] Field of Search .................................. 370/60, 77, 79, 370/85.1, 85.9, 85.11, 85.13, 94.1, 110.1, 85.7, 85.8, 95.1, 95.2, 95.3, 94.2; 379/58, 59, 60, 63; 340/825.34, 825.44, 825.5, 825.51, 825.52, 825.06; 455/33.1, 33.2, 33.3, 38.1, 53.1, 54.1, 67.1

[56] References Cited

U.S. PATENT DOCUMENTS

| | | | |
|---|---|---|---|
| 4,574,284 | 3/1986 | Feldman et al. | 370/79 |
| 4,748,618 | 5/1988 | Brown et al. | 370/94.1 |
| 4,811,339 | 3/1989 | Bouillot et al. | 370/94.1 |
| 4,882,727 | 11/1989 | Williams et al. | 370/79 |
| 4,905,234 | 2/1990 | Childress et al. | 370/94.1 |
| 4,922,486 | 5/1990 | Lidinsky et al. | 370/94.1 |
| 4,979,169 | 12/1990 | Almond et al. | 370/79 |
| 5,008,925 | 4/1991 | Pireh | 379/60 |

Primary Examiner—Alpus Hsu
Attorney, Agent, or Firm—Val Jean F. Hillman

[57] ABSTRACT

A communications system having a plurality of different radio-types (528, 530 and 532) when integrated into a single node or control module (500) provides communications with a plurality of different end users (502, 506 and 508) having different transmission protocols. The steps involved comprise coupling the plurality of communication devices (528, 530 and 532) together via a bus (526) and coupling at least one processing unit (517) to the bus (526). Signals received by RF devices (528, 530 and 532) are communicated onto the bus (526) and processed by the processing unit (517) into processed signals. Processed signals comprise data and control information which are stored in memory (522). Thereafter, the processed signals stored in memory (522) are returned back onto the bus (526) for use by at least one of the plurality of communication devices (528, 530 and 532).

15 Claims, 5 Drawing Sheets

—PRIOR ART—

—PRIOR ART—

—PRIOR ART—

—PRIOR ART—

SIGNAL COMMUNICATION METHOD AND APPARATUS

FIELD OF THE INVENTION

This invention relates generally to radio communication systems and more particularly describes an architecture for signal communication and information processing within a voice and data packet communications system.

BACKGROUND OF THE INVENTION

Digital radio communications is one of the fastest growing services currently offered by the telecommunications industry. Within the field of digital radio communications, a relative newcomer is the packet transmission communications system.

Packet transmission systems have proven technically reliable and commercially valuable for the communication of information which occurs in bursts, such as computer data and digitized speech. The success achieved by packet transmission systems relates in part to the fact that the system's bandwidth is not continuously required by one communicator and thus may be shared by many via any of the well known multiple access schemes including, but not limited to Time Division Multiple Access (TDMA), Frequency Division Multiple Access (FDMA), Code Division Multiple Access (CDMA) and Space Division Multiple Access (SDMA). Also, packet transmission can be readily handled by modern digital equipment. For more on packet transmission systems, the interested reader may refer to U.S. Pat. No. 4,905,231 Leung et al. and U.S. Pat. No. 4,992,486 Lindinsky et al.

A number of packet transmission communication systems now exist in which a Node or controller communicates with a plurality of remote communication devices. Such systems include, but are not limited to:

the digital radiotelephone communication system, Group System Mobile (GSM), for use in Europe and defined in GSM documents GSM 05.01 "Physical Layer on the Radio Path: General Description" and GSM 05.02 "Multiplexing and Multiple Access On the Radio Path";

the voice and data communication system described in U.S. patent application Ser. No. 07/719,212, filed Jun. 21, 1991, entitled Voice and Data Packet Communication Method and Apparatus, as assigned to the assignee of the present invention; and the digital radiotelephone communication system, Digital European Cordless Telecommunications (DECT), for use in the European Personal Communications arena, as described in the following articles:

C. Van Diepenbeek, "DECT, A GENERAL OVERVIEW", Fourth Nordic Seminar on Digital Mobile Radio Communications DMR IV, Oslo; 26–28 June 1990;

A. Bud, "SYSTEMS & NETWORK ASPECTS OF DECT", Fourth Nordic Seminar on Digital Mobile Radio Communications DMR IV, Oslo; 26–28 June 1990; and Dr. H. Ochsner, "RADIO ASPECTS OF DECT", Fourth Nordic Seminar on Digital Mobile Radio Communications DMR IV, Oslo; 26–28 June 1990.

Each of the above-listed systems is characterized by a defined set of operating frequencies and distinguished by a distinct air interface, hereinafter referred to as a transmission protocol, no two of which are exactly alike. For example, FIG. 1 depicts the data structure of a GSM burst transmission 100. Each GSM burst transmission consists of one hundred and forty eight (148) bits which are transmitted at a rate of 270.833 kilobits/second. One hundred and fourteen (114) of these bits 110 are available for actual data transmission, the rest are used to assist reception and detection of the burst 100. A training sequence in the middle of the burst, referred to as the synchronization signal pattern or Synch Word 120, is used to estimate the radio channel impulse response and to assist in the synchronization of a receiver's operations. Three header or tail bits 105 at either end of a burst delimit the begin and/or end of a burst. Finally, two stealing flags 115 immediately before and after the Synch Word 120 indicate that a burst which originally had been assigned to a traffic channel was "stolen" to be reassigned for signalling purposes.

In contrast, FIG. 2 depicts the data structure of a DECT burst transmission 200. Each DECT burst transmission consists of four hundred and twenty (420) bits which are transmitted at a rate of approximately 1152 kilobits/second. Three hundred and twenty (320) of these bits 220 are available for actual data transmission, the rest are used to assist reception and detection of the burst 200. A training sequence 205 at the head of the burst 200, referred to as the synchronization signal pattern or Synch Word, is used to assist synchronize a receiver's operation. Forty Eight bits 210 facilitate the multiplexing of DECT Logical Channels. Thereafter, sixteen bits 215 provide a Cyclic Redundancy Check (CRC) function, used to verify the correctness of the received data. Finally four bits 225 are used to recognize radio interference of the received data.

FIG. 3 depicts the data structure of a burst transmission 300 utilized by the packet transmission communication system described in U.S. patent application Ser. No. 07/719, 212, filed Jun. 21, 1991, entitled Voice and Data Packet Communication Method and Apparatus. The format consists of a training sequence 305, referred to as the synchronization signal pattern or Synch Word, a packet header field 310 and data field 320. As previously discussed, the Synch Word 305 is provided for synchronization purposes. The packet header 310 will be explained in more detail below. The data field 320 represents the information to be communicated between users.

FIG. 4 illustrates the information contained within the packet header 310 of FIG. 3. The header 310 includes a virtual circuit identification field 311, a packet length field 313, destination information field 315, and a validation information field 317. The virtual circuit identification field 311 contains information that specifies a register address which holds control information that directs where the data field 320 of a burst transmission 300 is stored in memory. The packet length field 313 provides information concerning the length of the data field 320. The destination information field 315 contains the intermediate destination address information which determines if the data field 320 is stored in memory. Finally, the validation information field 317 contains data associated with a CRC data accuracy calculation.

From the foregoing, it is apparent that communications equipment (radios) designed to operate utilizing the GSM format and associated frequencies will be incapable of accessing or communicating with communications equipment designed per the DECT specification. The same is true for other radio communications equipment designed for systems which either operate on differing communications channels or employ incompatible transmission protocols. Such systems include, but are not limited to: the UK's Personal Communications Network (PCN), also referred to as DCS1800, the United States Digital Cellular System (USDC), Japan's Digital Cellular System (JDC) and the like.

In light of the incompatible nature of existing packet transmission communication systems, and in recognition of the modern trend toward compatibility, it would be extremely advantageous to provide a common communications Node which is capable of supporting a variety of different radio-types, i.e., a plurality of different communications systems.

SUMMARY OF THE INVENTION

Briefly described, the present invention is a method and apparatus for communicating signals to a plurality of communication devices integrated into a communication systems Node, when some of the communication devices have different transmission protocols. In this effort, the plurality of communication devices are coupled together via a bus. Thereafter, at least one processing unit is coupled to the bus in order to process at least a portion of the signals transferred over the bus by a communications device, into a processed signal. After storing at least a portion of the processed signal in memory, at least a portion of the stored processed signal is returned to the bus and later extracted by at least one of the plurality of communication devices having the same protocol.

In accordance with a second embodiment of the present invention, the communications device plurality consists of a plurality of radios which operate on different communication channels.

DESCRIPTION OF A PREFERRED EMBODIMENT

Figure 5:
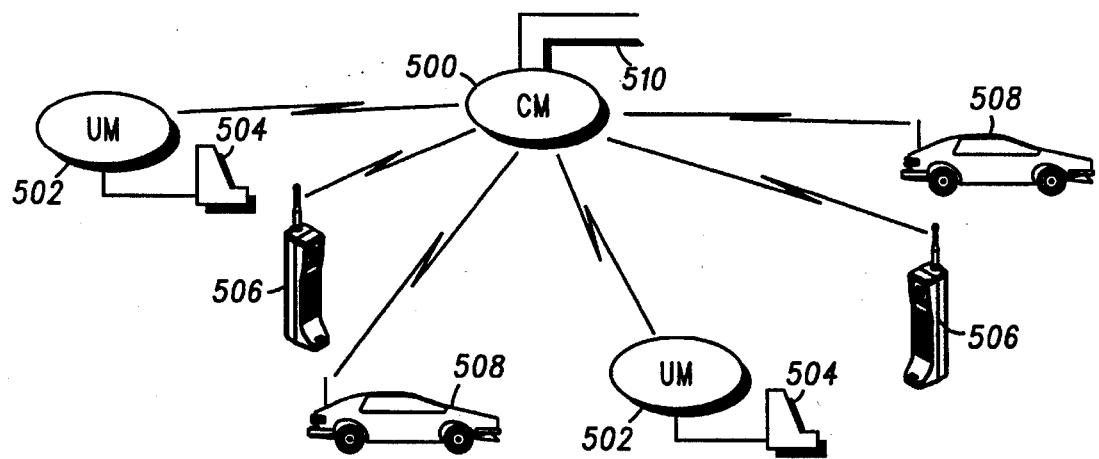
FIG. 5 illustrates a communication system suited for incorporating the present invention.

FIG. 5 illustrates a packet transmission communication system in which a control module or Node 500 utilizes RF communications to communicate with portable end users 506, mobile end users 508, as well as fixed site user modules 502 that are coupled to one or more peripheral devices 504 consisting of a terminal, personal computer, telephone, or other information input/output device. In the illustrative system, the control module 500 is also coupled by a channel 510 to a network. The data network to which control module 500 is connected may consist of an Ethernet network, an ISDN network, a token ring network or any other conventional communications network, like those known in the art. The control module 500 controls communications with the illustrated network and passes information from the network via the channel 510 to the peripheral devices 504 via the associated user module 502 or to an appropriate end user 506, 508. The control module 500 also controls local communications by receiving information from end users 506 and 508 via respective RF communications channels and relaying the information to a similar end user 506 or 508 over an RF communications channel associated with that device. This information is conveyed in the form of packets.

Figure 1:
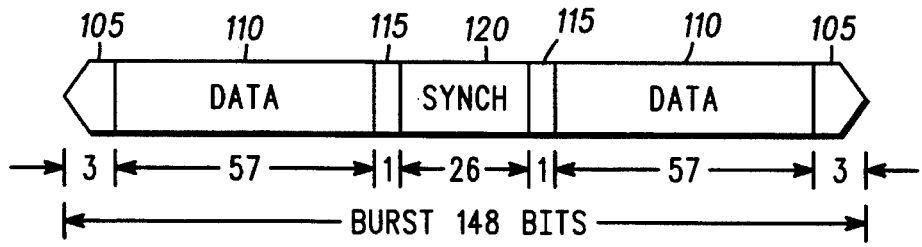
FIG. 1 depicts the data structure of a GSM burst transmission according to the prior art.
Figure 2:
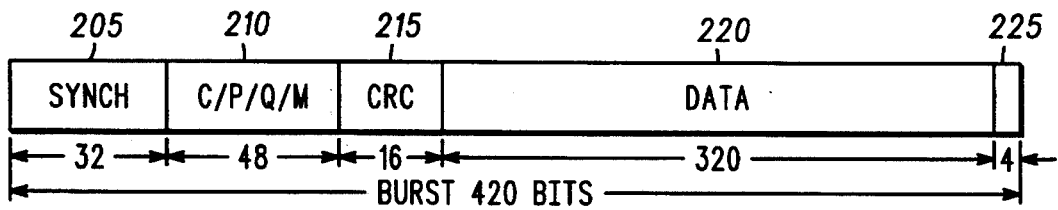
FIG. 2 depicts the data structure of a DECT burst transmission according to the prior art.
Figure 3:
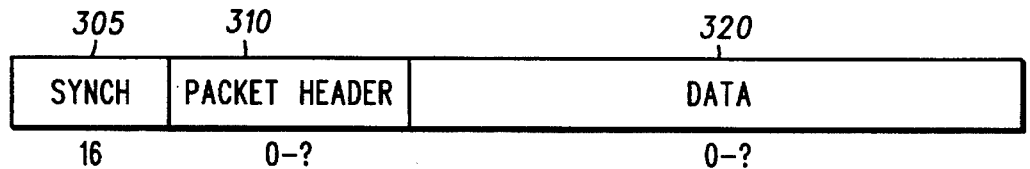
FIG. 3 depicts the data structure of a burst transmission for a wireless local area network in accordance with the prior art.
Figure 4:
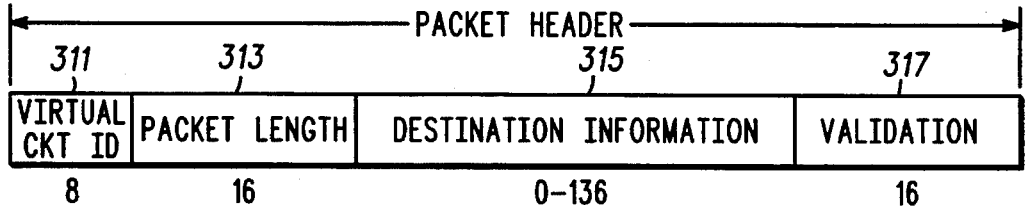
FIG. 4 illustrates the information contained in the packet header of FIG. 3.

In accordance with the present invention, end users 502, 506 and 508 each have a separate and distinct RF transmissions protocol. For example, mobile end users 508 utilizes the GSM transmission data structure of FIG. 1, portable end users 506 utilize the DECT transmission data structure of FIG. 2, while the fixed end user modules 502 utilize the transmission data structures of FIG. 3. Thus, unlike in a typical packet transmission communications system, the control module 500 of the present invention is capable of supporting a plurality of different radio-types and associated communications systems.

Figure 6:
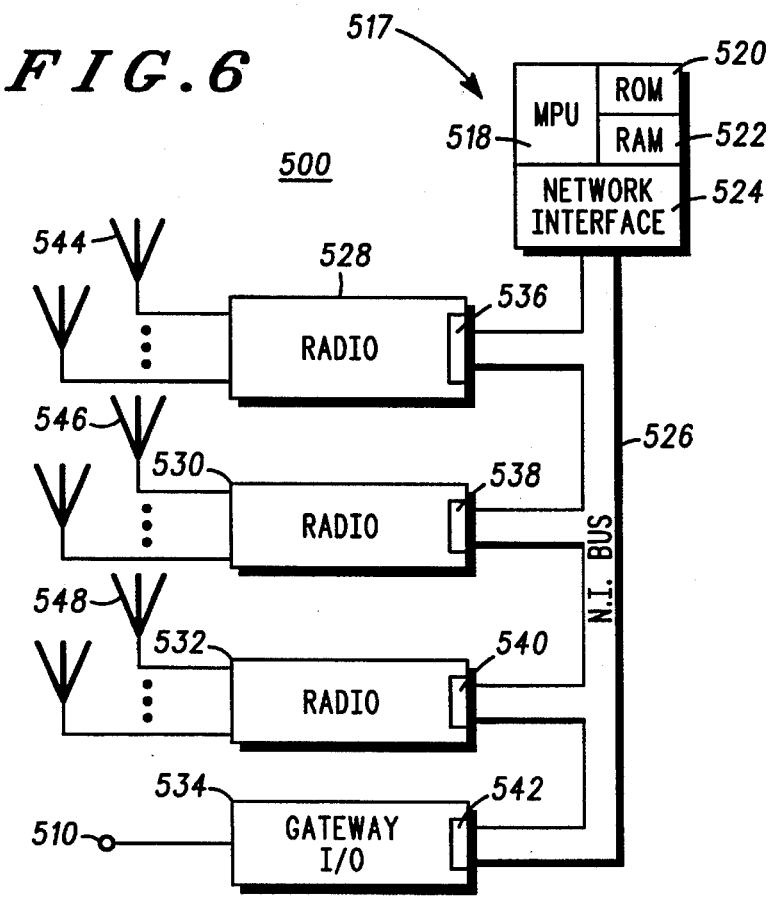
FIG. 6 is a block diagram of the control module of FIG. 5 in accordance with the present invention.

FIG. 6 illustrates a block diagram of the control module 500 as shown in FIG. 5. A communications controller 517 includes a microprocessor 518, with associated read only memory 520, random access memory 522, and a network interface 524. The network interface 524 consists of appropriate registers and line drivers for communication with the plurality of communications devices interconnected by the network interface (NI) bus 526. According to the physical structure of FIG. 6, the communications devices comprise a plurality of two-way RF radios 528, 530 and 532 and at least one gateway input/output device 534, which can consist of a T1 gateway I/O device, an ISDN gateway I/O device, a token ring I/O device, or a telephone I/O device. Each radio 528, 530, and 532 contains a NI bus interface 536, 538, 540, respectively. Likewise, the gateway I/O device 534 contains a NI interface 542. These interfaces provide the necessary registers and line drivers for communicating on the NI bus 526 and will also include an MPU, RAM, and ROM if these resources are not available in the integrated devices.

Each radio includes one or more antennas designated 544, 546 and 548 for RF communications with an associated end user, as shown in FIG. 5. While it has been suggested that the radios individually comprise a GSM radio 528, a DECT radio 530 and a radio 532 which supports wireless LAN operations, these illustrative examples merely represent that virtually any RF packet transmission system can be incorporated into a universal Node in accordance with the present invention. Other viable packet transmission systems include, but are not limited to: the UK's Personal Communications Network (PCN), also referred to as DCS1800, the United States Digital Cellular System (USDC), Japan's Digital Cellular System (JDC) and the like.

The gateway I/O device 534 is coupled by the channel 510 to an associated Ethernet, token ring, ISDN or telephone network. Once again, these illustrative networks are merely representative that virtually any type of packetized information can be coupled by means of an appropriate input/output device to the NI bus 526. Moreover, while the preferred embodiment shows a NI bus 526 connecting the various radios and the I/O gateway together via the communications controller 517, it will be appreciated by those skilled in the art that the NI bus can be substituted by a TDM bus, bi-directional buses or packet switches which are all known in the art.

Figure 7:
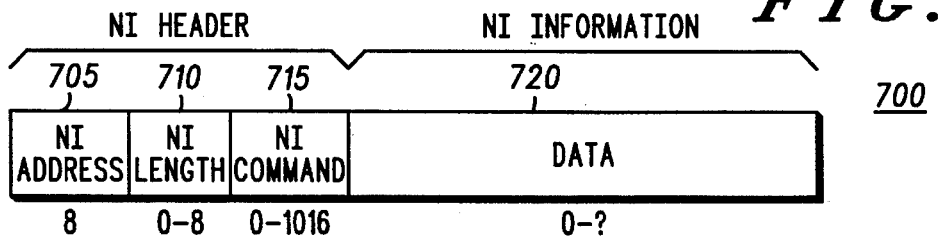
FIGS. 7 illustrate the packet format utilized in a preferred embodiment of the present invention.

FIG. 7 illustrates a preferred embodiment of a packet format 700 utilized for communications over the NI bus 526. It is segmented to contain a NI header, and a NI information field. Each packet on the NI bus will always have a NI header. The complete NI header consists of a NI address field 705, containing the address of the device which is to receive the packet, a NI length field 710 indicating the length of the NI command field 715, and a NI command field 715 which consists of commands or initialization information to be used by the device receiving the packet over the bus. Common commands may include poll for status, poll for data, and transmit/receive data.

In its complete form, the NI header will not always be followed by a NI information field, as discussed below. In its abbreviated form, however, the NI header will always be followed by a NI information field. In its abbreviated form, the NI header must contain at least the NI address field 705 and may therefore not require a NI length 710 or a NI command field 715.

Immediately following the NI header of FIG. 7 is the NI information field comprising data field 720. This portion of the packet format 700 consists of the information to be transferred over the NI bus 526. For example, if a packet 700 addressed to the GSM radio 528, contained a transmit data command, the data information field 720 would contain the data to be transmitted, formatted in accordance with the data structure of FIG. 1. Similarly, if a packet 700 addressed to the DECT radio 530, contained a transmit data command, the data information field 720 would contain the data to be transmitted, formatted in accordance with the data structure of FIG. 2. Thus, depending on the NI header commands, the data information field 720 may or may not be present. For example, a poll for status command, sent by the controller 517 to the GSM radio 528 might not require a data information field 720.

The methods described below will most advantageously be integrated into a conventional software operating system that provides various operational capabilities dependent upon the specific operating environment.

Figure 8:
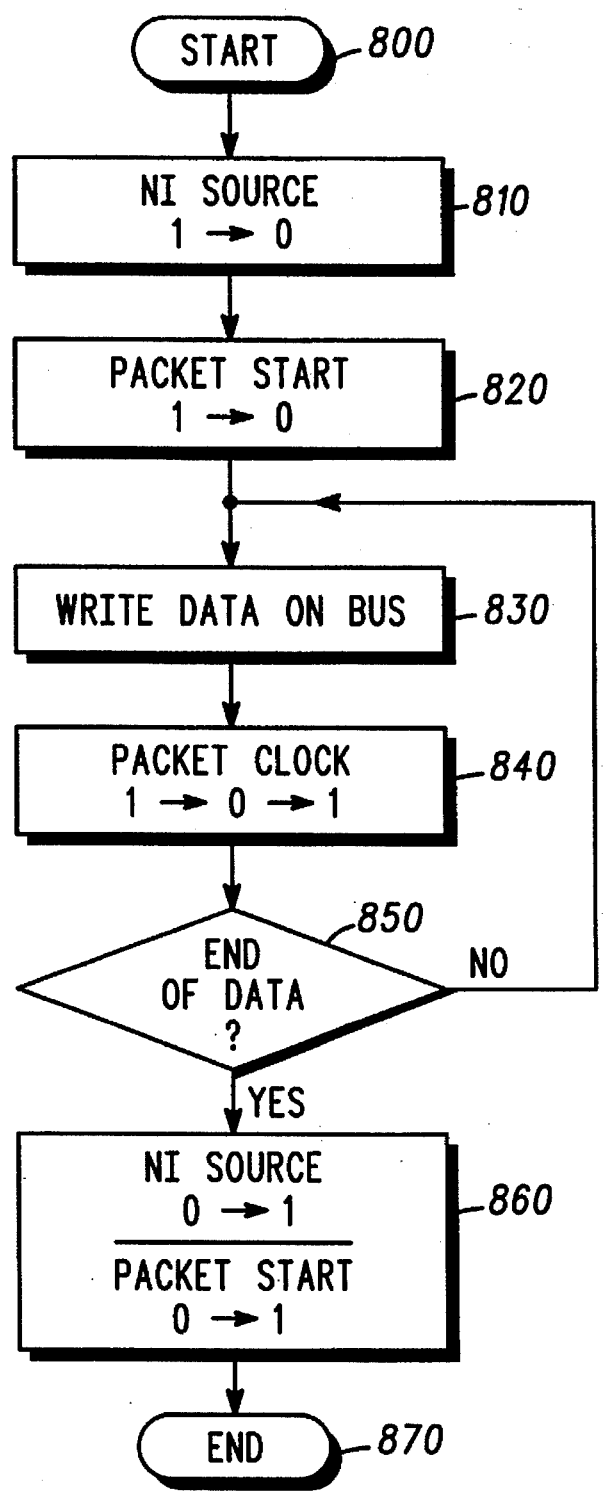
FIG. 8 is a flow diagram illustrating the transmission of data from a controller to a communications device as shown in FIG. 6.
Figure 9:
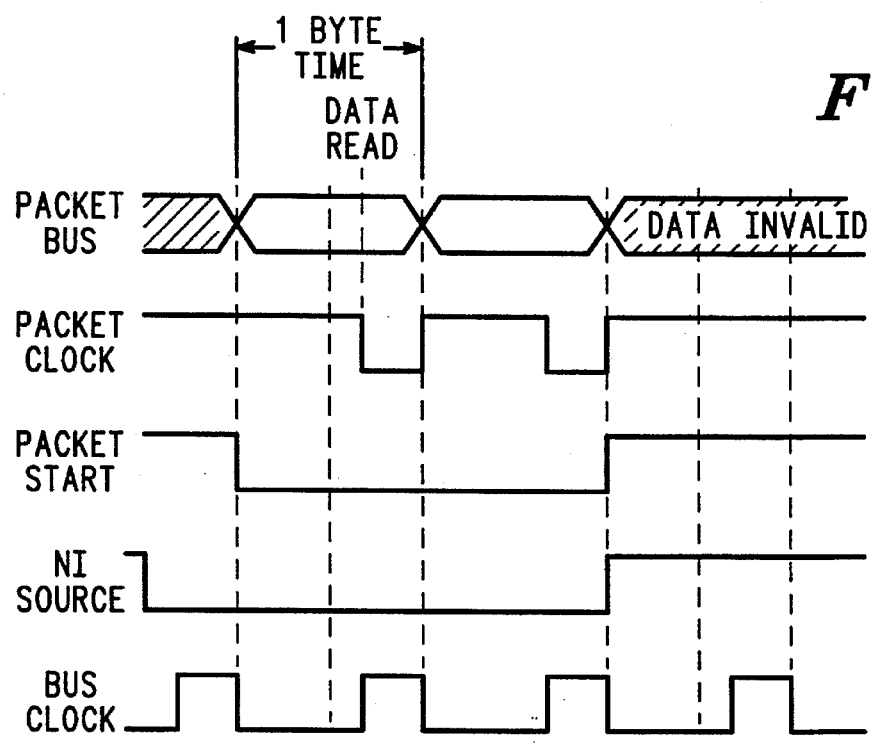
FIG. 9 is a timing diagram illustrating control signals utilized to receive information at a communications device in accordance with the flow diagram of FIG. 8.

FIG. 8 is a flow diagram illustrating the steps implemented by the communications controller 517 of FIG. 6 to transmit data or commands to a communications device connected to the NI bus. The timing diagram illustrated in FIG. 9 also relates to the transmission of packets of data from the communications controller to the communications devices and should be read in conjunction with the steps described in FIG. 8. The timing diagram in FIG. 9 represents the physical NI bus which consists of a packet bus having eight lines for conveying a byte of data during each bus clock cycle and separate control lines for packet clock, packet start, NI source, and bus clock. The NI source and bus clock lines are always controlled by the communications controller; the remaining lines and packet bus are bi-directional, i.e. the communications controller and the communication devices are capable of writing to and reading these lines.

The transmission of data from the communications controller 517 to a communication devices is accomplished as follows. Beginning with entry at START 800, the controller 517 drives the NI source line from high to low as indicated in step 810. This gives the controller control of the NI bus and communicates to all devices that they are to receive data which will be transmitted from the controller. In step 820 the controller drives the packet start line from high to low which marks the beginning of the transmission of a packet to be transmitted by the controller to a communication devices. Next, the controller writes a byte of data on the packet bus as indicated by step 830. In step 840, the controller drives the packet clock line from high to low and back high. The communication devices read the data written on the packet bus during the high to low transition of the packet clock. In decision step 850 the controller determines if all data has been transmitted. If NO, the next byte of data is written on the packet bus by returning to step 830 and the cycle repeated. Upon completing the writing of all data (step 850=YES) the controller drives the NI source line from low to high releasing control of the NI bus and packet start from low to high marking the end of the packet in step 860. This method terminates at END 870.

In the illustrative example as shown in FIGS. 8 and 9, the communications controller sent two bytes of a single packet as illustrated in FIG. 7 to one or a predetermined group of communication devices. The NI header contains the communication devices address of a particular device or a group address for a predetermined group of devices. After receiving and decoding the device address contained in the NI header, each communication devices can determine if the following information is intended for it. If the information is intended for a device, then it will continue reading the data transmitted by the controller. If the packet is not intended for a device, then it need not further process the information and can merely look for a low to high transition of the packet start line indicating the end of transmission of that packet. Although the illustrative example of FIG. 9 indicated the simultaneous transition of NI source and packet start in step 860, the controller may alternatively maintain the NI source line low, indicate the end of the packet transmission by driving the packet start line from low to high and then begin transmission of another packet by driving packet start from high to low, thereby not relinquishing control of the NI bus between the transmission of successive packets. The packet clock line is controlled by the transmitting device with the high to low transition being a signal to the receiving device that data on the packet bus is stable and should be read.

Figure 11:
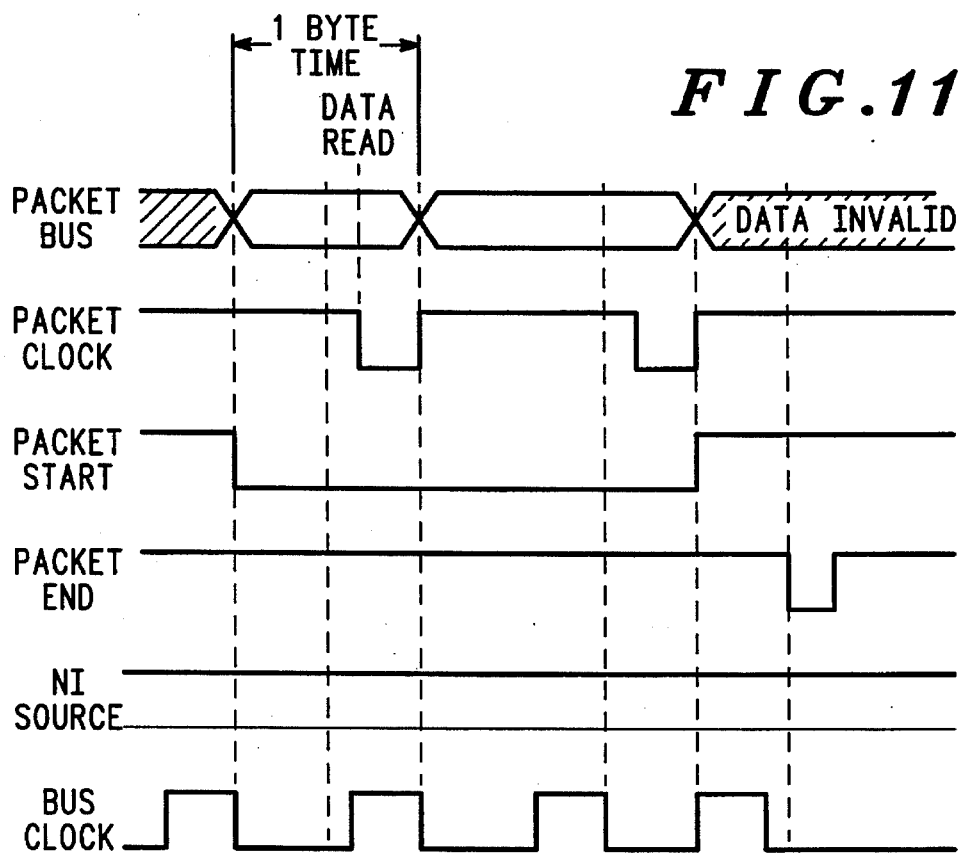
FIG. 11 is a timing diagram illustrating control signals utilized to transmit information from a communications device in accordance with the steps of FIG. 10.
Figure 10:
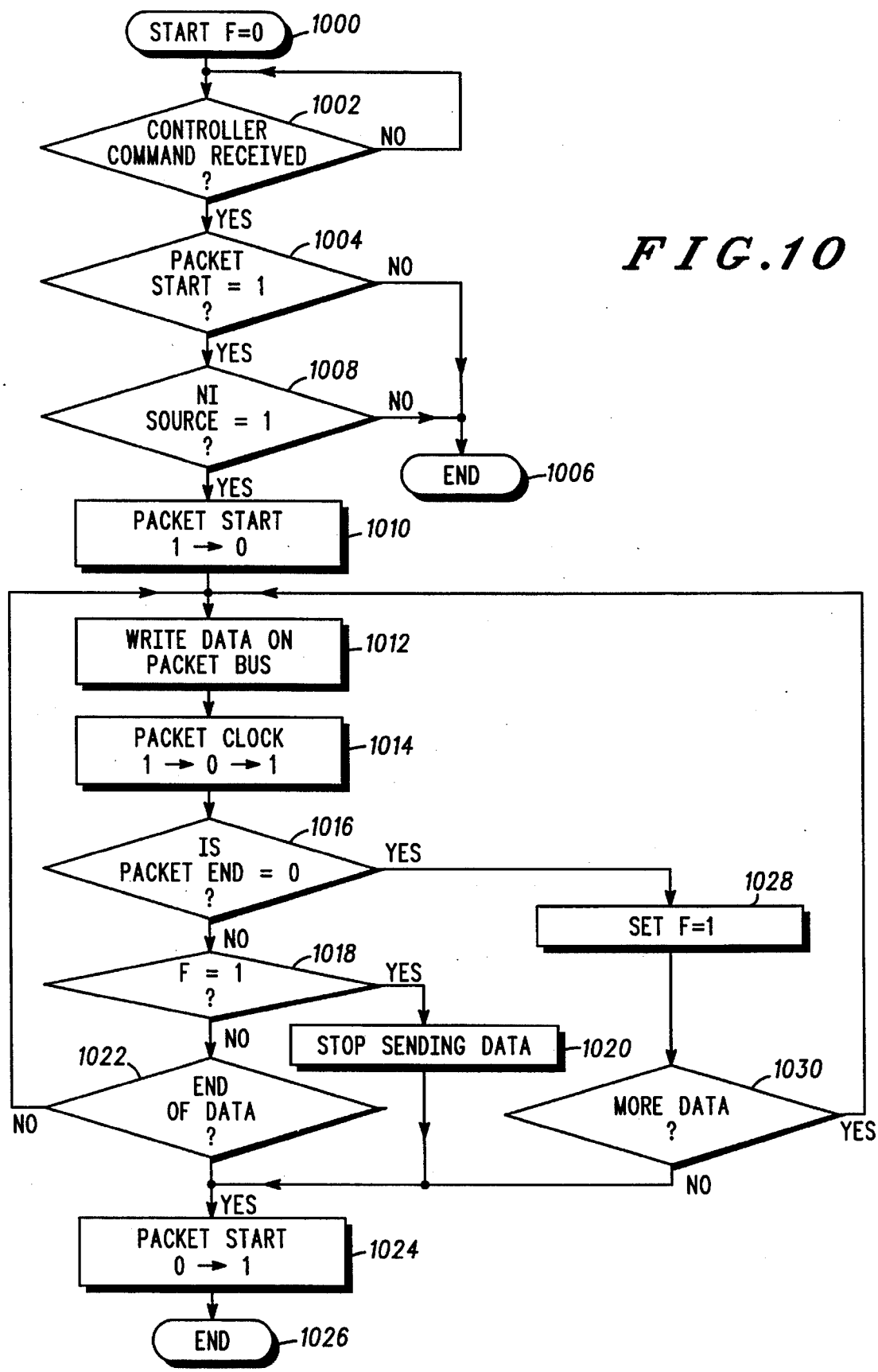
FIG. 10 is a flow diagram illustrating the transmission of data from a communications device to the controller shown in FIG. 6.

FIG. 10 shows a flow diagram illustrating steps performed by a communications device in transmitting data to the communications controller. These steps should be read in conjunction with the timing diagram shown in FIG. 11. The timing diagram in FIG. 11 illustrates one additional control line, packet end, not shown in FIG. 9. In the preceding description relating to FIG. 9, the packet bus, packet clock, and packet start lines were sourced by the communications controller. With regard to FIG. 11, the packet bus, packet clock, and packet start lines are sourced by a communications device. The packet end, NI source, and bus clock are sourced by the controller.

In START step 1000 of FIG. 10, a flag (F) is set to zero. This flag generally relates to the ability of the controller to allow certain additional data to be transmitted after the end of the packet as marked by packet end. The operation of this flag is explained in detail below. At step 1002 a determination is made if a controller command has been received. If so, flow will proceed to step 1004. In step 1004, a determination is made if packet start is high. A NO decision results in the termination of the method at END 1006 since packet start must be high in order for a communications device to initiate data transmission over the NI bus. Following a YES decision by step 1004, step 1008 determines if NI source is high. A NO decision by step 1008 results in the termination of the method at END 1006 since a communications device will not normally be able to transmit data when the NI source line is low except upon being instructed by a prior command send by the controller on the packet bus. A YES decision by step 1008 indicates that the NI bus is available for data transmission by the communications device.

In step 1010 the communications device drives packet start line from high to low thereby advising the controller to receive data. The communications device then proceeds to write data on the packet bus in step 1012. The communications device then drives the packet clock line from high to low to high at step 1014, which provides a timing signal to the controller to read the data on the packet bus. In step 1016 a decision is made if packet end is low. The packet end line is controlled by the controller and is utilized to provide an override control which can be exercised by the controller to prematurely terminate transmission by a communications device. A NO decision in step 1016 leads to a determination in step 1018 if flag F is high. A YES decision results in the communications device initiating a stop sending data sequence 1020 in which transmission of data is stopped. A NO determination by step 1018, i.e. the flag is not set, results in a determination by the communications device as to whether all data has been transmitted in step 1022. A NO decision returns control to step 1012 in which additional data is transmitted to the controller. A YES determination by step 1022, indicating the end of desired data transmission by the communications device, results in the device driving the packet start from low to high as indicated in step 1024. This tells the controller that the communications device has finished transmitting the packet. Following step 1024 the method terminates at END 1026.

The following explanation indicates the ability of the controller to prematurely end the transmission of data by the communications device. This sequence is initiated by the controller driving packet end line low, a YES decision by step 1016. In step 1028 the communications device responds to this command by setting flag F equal to 1. In step 1030 a determination is made by the communications device if more data remains to be sent to the controller. A NO decision results in terminating the transmission by return to steps 1024 and 1026. A YES determination by step 1030, indicating that more data is to be sent, causes a return to step 1012 in which the next byte of data is written to the packet bus and the packet clock is incremented in step 1014. If the packet end line remains low as determined by step 1016 the same sequence of steps will proceed until the communications device has transmitted all of its data as determined by step 1030. However, if the controller has caused the flag F to be reset by driving packet end from low to high, a NO determination will be made by step 1016. In this case, step 1018 will result in a YES determination since the flag has been set thereby implementing the immediate stop function by step 1020. Thus, the controller can terminate the transmission of data by a communications device by driving packet end from high to low to high.

In the illustrative example as shown in FIG. 11, the packet start line is driven by the communications device from low to high prior to a packet end line termination command, i.e. from high to low to high. Thus, this example illustrates that the communications device completed the transmission of its data without a premature interruption by the controller. The heavy dashed line associated with the packet start line in FIG. 11 illustrates an alternative example in which the communications device continued to have data to send but was interrupted by the packet end command, whereby the packet start line remains low until the beginning of the heavy dashed line and returns high concurrent with the packet end line being driven from low to high by the controller. This mechanism is advantageous in that it permits the possibility of additional bytes of data to be transmitted beyond a predefined packet as determined by the packet start line. Thus it is possible for a communications device to immediately send a number of bytes of additional information following a packet. Such bytes of information can be utilized to monitor conditions of the communications device or may correspond to general update information provided by the communications device following the transmission of the packet. This permits such information to be communicated without requiring it being carried within a packet. This provides additional flexibility of communications which is especially advantageous when a plurality of communications device each communicate with a common controller.

If one communications device is transmitting a packet of information which is destined for another communications device attached to the NI bus, the controller will process the packet and reformat a packet with a NI header addressed to the destination communications device and transmit it over the NI bus. Thus, the communications controller acts as a traffic director in routing packets and information between communications device as well as providing a common point of coordination of communications.

In summary, the present invention comprises a method and/or apparatus for communicating signals, consisting of control and data information, to a plurality of communications devices having different transmission protocols comprising the steps of coupling a plurality of communication devices together via a bus and coupling at least one processing unit to the bus. Processing in the processing unit, the signals transferred over the bus by at least one of the communications devices, into a processed signals and storing the processed signals in memory. Thereafter the stored signals are returned back onto the bus on command, for extraction from the bus by at least one of the plurality of communication devices. These signals then made ready for retransmission.

What is claimed is:

1. In a communications system having a plurality of Radio Frequency (RF) communications devices integrated into a Node, with some of the communications device having different RF transmission protocols, a method for communicating signals, consisting of control and data information, to said plurality of RF communications devices comprising the steps of:

coupling the plurality of RF communications devices together via a bus;

coupling at least one processing unit to the bus;

processing in the processing unit, signals transferred onto the bus by at least one of the RF communications devices, into processed signals;

storing the processed signals in memory;

returning processed signals stored in memory back onto the bus; and extracting the returned signals' information from the bus by at least one of the plurality of RF communications devices having the same RF transmission protocol as the RF communications device that initially transferred the signal onto the bus for processing.

2. The method of claim 1 wherein the step of processing further comprises the steps of:

decoding the signals transferred onto the bus by at least one of the RF communications devices; and determining if the decoded signal's information will be stored.

3. The method of claim 1 wherein the step of storing further comprising the steps of:

storing the data information portion of the processed signal in said memory; and storing the control information portion of the processed signal in said memory.

4. The method of claim 1 wherein the step of returning processed signals stored in memory back onto the bus further comprises the steps of:

retrieving the data information portion of a processed signal from said memory;

retrieving the control information portion of a processed signal from said memory; and routing the retrieved data and control information portions of a processed signal back onto the bus.

5. The method of claim 1 wherein the step of extracting further comprises the steps of:

monitoring the bus, by each RF communications device, for said returned control information portions of a processed signal;

decoding the returned control information portions of a processed signal to determine bus activity; and reading the returned data information portions of a processed signal, said data information to be used during data transmission.

6. The method of claim 1 further comprising the step of transmitting the extracted signal information from an RF communications device over the communication channels associated with that device.

7. In a communications system having a plurality of Radio Frequency (RF) communications devices integrated into a Node, some of the RF communications devices having incompatible RF transmission protocols, a device for communicating signals, consisting of control and data information, to said plurality of RF communications devices comprising:

a bus having control lines and data lines, each RF communications device operably coupled to the bus;

means, operably coupled to the control lines, for communicating control information to and from the plurality of RF communications devices;

means, operably coupled to the data lines, for processing signals transferred over the data lines by an RF communications device, into processed signals;

memory, operably coupled to the processing means, for storing the processed signals;

means, operably coupled to the memory for returning the processed signals stored in memory back onto the data lines;

means, operably coupled to the plurality of RF communications devices, for monitoring the control lines to detect data line activity; and means, operably coupled to the communications devices, for extracting information from the data lines as a function of the detected data line activity.

8. The device of claim 7 wherein the communicated signals comprise multiple packets of information.

9. The device according to claim 8 wherein the multiple packets of information comprise at least one of:

speech traffic; and data traffic.

10. The device of claim 8 wherein the bus is a Network Interface (NI) bus.

11. The communication system of claim 10 wherein said control lines in the Network Interface (NI) bus communicates control packets to the communications device plurality, and comprise a control clock, a data clock, a packet start line, and a packet end line; and said data lines in the Network Interface (NI) bus communicates data packets to the communications device plurality.

12. The device of claim 7 further comprising:

means for transmitting extracted signal information from an RF communications device having the same RF transmission protocol as the RF communications device that transferred the signal over the data lines for processing.

13. A method for communicating signal information to a plurality of different radio types integrated into a communications system Node, said Node having a network interface bus comprising control lines for communicating control information and a data bus for communicating data information, wherein each radio type has an incompatible transmission protocol, said method comprising the steps of:

coupling a plurality of different radio types together via the network interface bus;

coupling at least one processing unit to the network interface bus;

processing, in the processing unit, at least a portion of the signal information transferred over the data bus by a radio type, into a radio typed processed signal;

storing the radio typed processed signal in memory;

returning the radio typed processed signal back onto the data bus upon command;

monitoring the control lines by the plurality of radio types to detect data bus activity;

extracting the returned radio typed processed signal from the data bus by a radio, as a function of the detected data bus activity; and transmitting the extracted signal information from the radio, utilizing the transmission protocol associated with that radio.

14. The method of claim 13 wherein the step of extracting is performed by a radio of the same radio type as the radio that transferred the signal information over the data lines for processing.

15. The method of claim 13 wherein the step of transmitting is further characterized by:

transmitting the extracted signal information over the communication channels associated with that radio.

* * * * *